United States Patent
Bartels et al.

(10) Patent No.: US 12,084,079 B2
(45) Date of Patent: Sep. 10, 2024

(54) METHOD FOR OPERATING A MOTOR VEHICLE ASSISTANCE SYSTEM AND AN ASSISTANCE SYSTEM

(71) Applicant: Volkswagen Aktiengesellschaft, Wolfsburg (DE)

(72) Inventors: Arne Bartels, Wolfsburg (DE); Frank Bärecke, Wolfsburg (DE); Timo Klingemann, Sassenburg (DE); Thomas Kolms, Wasbüttel (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 108 days.

(21) Appl. No.: 17/510,379

(22) Filed: Oct. 26, 2021

(65) Prior Publication Data

US 2022/0126855 A1    Apr. 28, 2022

(30) Foreign Application Priority Data

Oct. 26, 2020   (DE) .......................... 102020213428.6

(51) Int. Cl.
*B60W 50/14*  (2020.01)
*B60W 30/08*  (2012.01)
*B60W 30/10*  (2006.01)

(52) U.S. Cl.
CPC ............ *B60W 50/14* (2013.01); *B60W 30/08* (2013.01); *B60W 30/10* (2013.01);
(Continued)

(58) Field of Classification Search
CPC .. B60T 2201/083; B60T 7/22; B60T 8/17557; B60T 8/32; G06V 20/588; B60W 2420/42; B60W 2422/40; B60W 2510/22; B60W 2520/28; B60W 2540/18; B60W 2552/45; B60W 2556/50; B60W 2756/10;
(Continued)

(56) References Cited

U.S. PATENT DOCUMENTS

2004/0204812 A1* 10/2004 Tran ...................... G01N 21/84
                                                            701/80
2011/0251749 A1    10/2011 Schwarz et al.
(Continued)

FOREIGN PATENT DOCUMENTS

DE    102005037273 A1    2/2007
DE    102013223367 A1    5/2015
(Continued)

*Primary Examiner* — Quan Zhen Wang
*Assistant Examiner* — Rajsheed O Black-Childress
(74) *Attorney, Agent, or Firm* — Peter Zura; LOZA & LOZA, LLP

(57) ABSTRACT

Technologies and techniques for operating an assistance system in a motor vehicle with which a driving a shoulder by the motor vehicle is detected by means of at least one detection device in the assistance system, and with which a control signal is generated by means of an electronic computing device in the assistance system for engaging with a functional unit in the motor vehicle. The shoulder that is detected is evaluated in terms of the type of shoulder, and a critical or non-critical driving of the vehicle on the shoulder is determined on the basis of the type of shoulder, and the control signal is generated in the case of a critical driving on the shoulder. The present disclosure also relates to an assistance system.

20 Claims, 1 Drawing Sheet

(52) U.S. Cl.
CPC ... *B60W 2420/403* (2013.01); *B60W 2520/28* (2013.01); *B60W 2552/45* (2020.02); *B60W 2556/50* (2020.02); *B60W 2756/10* (2020.02)

(58) Field of Classification Search
CPC ...... B60W 30/02; B60W 30/08; B60W 30/10; B60W 40/06; B60W 40/064; B60W 50/14
See application file for complete search history.

(56) References Cited

U.S. PATENT DOCUMENTS

2012/0296567 A1* 11/2012 Breed ................. F02N 11/0807
701/468
2020/0062307 A1 2/2020 Min

FOREIGN PATENT DOCUMENTS

| | | | |
|---|---|---|---|
| DE | 102014006546 | A1 | 11/2015 |
| DE | 102016215840 | A1 | 3/2018 |
| DE | 112019000122 | T5 | 6/2020 |
| DE | 102019206875 | B3 * | 7/2020 |
| DE | 102019215118 | B3 | 2/2021 |
| EP | 2862767 | A2 | 4/2015 |
| EP | 3546312 | A1 | 10/2019 |
| GB | 2573738 | A1 | 11/2019 |
| WO | 19170532 | A1 | 9/2019 |

* cited by examiner

METHOD FOR OPERATING A MOTOR VEHICLE ASSISTANCE SYSTEM AND AN ASSISTANCE SYSTEM

CROSS REFERENCE TO RELATED APPLICATION

The present application claims priority to German Patent Application No. DE 102020213428.6, to Bartels, et al., filed October 2020, the contents of which being incorporated by reference in its entirety herein.

FIELD OF TECHNOLOGY

The present disclosure relates to technologies and techniques for operating a motor vehicle assistance system with which it is detected when the motor vehicle drives onto the shoulder of the road, by means of at least one detection device in the assistance system, and with which a control signal is generated when it has been detected that the motor vehicle has driven onto the shoulder by means of an electronic computing device in the assistance system, that engages with a functional unit in the motor vehicle. The present disclosure also relates to an assistance system.

BACKGROUND

Assistance systems are already known from the prior art that have a shoulder function and prevent skidding accidents therewith when the motor vehicle veers off onto a soft shoulder next to the road, this soft shoulder also being referred to as the shoulder of the road. The functioning thereof is such that when it has been detected that the vehicle has driven onto the shoulder, and the driver attempts to regain the road by turning abruptly, skidding is prevented by a selective braking of the wheels that are on the shoulder. The physical effect that results in this skidding is caused by the transition of the wheels from a low friction surface, such as a grass or sand shoulder, to a high friction surface, such as a road surface made of asphalt or concrete. This abrupt change in the friction coefficient, along with a strong steering reaction on the part of the driver results in abrupt lateral forces being transferred to the wheels as they transition from rolling on the shoulder to the asphalt. Thus results in a yaw torque, causing an oversteering of the motor vehicle. If the driver is unable to control the vehicle, it will skid.

US 2020/0066146 A1 discloses an information system comprising a control unit that is configured to record a screen image of a vehicle traveling on a road, wherein the screen image is photographed using an imaging unit. A dangerous driving state of the vehicle is identified by aligning the vehicle with a temporal course of the screen image. Information is displayed regarding the vehicle, based on which it is possible to determine that the vehicle is in the aforementioned dangerous driving state.

SUMMARY

Aspects of the present disclosure are to create a method and an assistance system that better assists a vehicle user in an assistance function.

These aspects are described by a method and an assistance system according to the independent claims. Advantageous embodiments are described in the dependent claims.

One aspect of the present disclosure relates to the operation of an assistance system in a motor vehicle with which at least one detection device in the assistance system detects when a motor vehicle drives onto a shoulder of a road, and with which a control signal is generated by means of an electronic computing device in the assistance system when it has been detected that the motor vehicle has driven onto the shoulder, that engages with a functional unit in the motor vehicle.

The shoulder of the road may be evaluated in terms of what type of shoulder it is, and it is then determined whether this is a critical or non-critical type of driving on the shoulder for the motor vehicle, and the control signal is only generated if this is a critical driving on the shoulder.

By this means, a user of the motor vehicle, who can be the motor vehicle's driver, can thus be reliably assisted with the assistance function. For example, a shoulder function for the motor vehicle is only triggered if the wheels on the left or right side are on a shoulder with a low friction surface, such as grass, sand, or gravel, and the other wheels are on a high friction surface, such as asphalt or concrete. The shoulder function is not triggered if the wheels on the left or right side are on a shoulder with a high friction surface, e.g., cobblestone, paving stone, grass paving stone, grass plastic paving, or rumble strips, and the other wheels are also on a high friction surface, e.g., asphalt or concrete. Furthermore, unnecessary triggering of the shoulder function caused by unevenness in the road surface or specific structures on the road surface should also be prevented. A shoulder function is to be understood to mean in particular that, when it has been detected that the vehicle is driving on the shoulder of the road, and the driver attempts to regain the road surface by means of an abrupt steering movement, skidding is prevented by a selective braking of the wheels, which corresponds in particular to the engagement with a functional unit.

In some examples, a triggering of the shoulder function is prevented therewith, if there is no major difference between the friction of the shoulder and that of the road. An unnecessary triggering is therefore prevented in this situation. For this reason, the sensors for detecting driving on the shoulder make a distinction between the scenarios described above, or between the different types of shoulders described above, respectively.

In some examples, a classification may be made to determine if the vehicle is driving on the shoulder. If the vehicle is driving on the shoulder, an evaluation is made to determine the type of shoulder. If it is determined that the shoulder has a low friction coefficient, e.g., because it comprises grass, sand or gravel, this is then regarded as a critical driving on the shoulder. If the shoulder has a high frictional coefficient, e.g., because it comprises cobblestones, paving stones, grass paving stone, grass plastic paving, or rumble strips, this is non-critical driving on the shoulder.

According to some examples, the shoulder may be evaluated with regard to its type by means of machine learning on the part of the electronic computing device. In particular, the type of shoulder may be classified through pattern recognition by evaluating the respective sensor data from the detection device using a sensor-specific evaluation. The evaluation software may be trained using learning data relating to the classification of the shoulder types described herein. Learning data may include the temporal courses of the respective sensor data recorded during a test drive on the different types of shoulders described above. This machine learning can also relate to a neural network. Information regarding whether or not the vehicle is traveling on a shoulder, and the type of shoulder, can be sent via an evaluation unit for the respective sensors in the electronic computing device to a data fusion algorithm in the electronic computing device via a data bus. This data fusion algorithm then determines, from the input data from the detection device, whether the vehicle is travelling on the shoulder, and whether it is a critical shoulder because of the low friction coefficient. If both cases are satisfied, the data fusion algorithm then sends this information to a triggering algorithm. If an abrupt steering action on the part of the driver in order to regain the road is also detected, this triggering algorithm then activates the shoulder function, such that a selective braking of the wheels on the shoulder is executed by means of an electronic stability program (ESP), for example.

In another example, the shoulder of the road is detected using a camera that functions as a detection device. This camera may be located at the front end of the motor vehicle. The camera can record image sequences, in particular, and then detect the shoulder of the road using an image processing algorithm, for example. The camera may be a detection device already present in the motor vehicle such that it can be reliably used, without requiring additional work in the production of the motor vehicle.

It is also advantageous if the type of shoulder can be evaluated on the basis of different image patterns for types of shoulders. Image data evaluation software can be used in particular for training purposes, which generate specific image patterns for the different types of shoulders in the image sequences in the camera data, which can then be assigned to the respective types of shoulders, thus distinguishing them from one another. After the training period, the data obtained while driving the vehicle with a camera aimed toward the front can be assigned to different types of shoulders, or classified therefor.

In another advantageous embodiment, the shoulder of the road may be detected by means of at least two-wheel speed sensors serving as detection devices on two different wheels of the motor vehicle. In particular, the shoulder of the road can be detected by means of four-wheel speed sensors on different wheels of the motor vehicle. In particular, the motor vehicle has four wheels, each of which has a respective wheel speed sensor. It is then possible to reliably determine whether the motor vehicle is on a shoulder of the road on the basis of the respective evaluations of the wheel speed sensors, or the detected wheel speeds for the individual wheels.

It may also be advantageous if an evaluation regarding the type of shoulder is also carried out on the basis of the temporal courses of the at least two-wheel speed sensors and by comparing the temporal courses, under some examples. In particular, the sensor data from the wheel speed sensors can include the temporal courses of the speeds of the motor vehicle wheels. When driving on rough surfaces such as those on the shoulder of the road, the temporal course of these wheel speed sensor data fluctuates significantly, even though the speed of the vehicle remains substantially constant while driving on the shoulder. The fact that different types of shoulders generate specific patterns or specific fluctuations in the temporal courses of the wheel speed sensor data, which can be assigned to the respective types of shoulders, thus distinguishing them from one another, is exploited during the learning process by the wheel speed sensor evaluation software. Many of the shoulder surfaces that have high friction coefficients, e.g., rumble strips made of concrete slabs, lane markings, grass paving stone, etc., exhibit uniform structures that are then reflected in the sensor data from the wheel speed sensors. After the training process, wheel speed data evaluation software can assign the measurement data obtained while driving the vehicle with wheel speed sensors to the different types of shoulders, or classify them therewith.

In some examples, the shoulder of the road may be detected by means of two vertical motion sensors on different wheels on the motor vehicle serving as the detection device. In particular, the motor vehicle can have individual vertical motion sensors on each of the four wheels. The sensor data from these vertical motion sensors comprise the temporal courses of the vertical motions of the four wheels on the motor vehicle. The temporal courses of the sensor data fluctuate on rough surfaces. The fact that different types of shoulders generate specific patterns or specific fluctuations in the temporal courses of the sensor data, which can be assigned to the respective types of shoulders, thus distinguishing them from one another, is exploited during the learning process for the vertical motion data evaluation software. Many of the shoulder surfaces that have high friction coefficients, e.g., rumble strips made of concrete slabs, lane markings, grass paving stone, etc., exhibit uniform structures that are then reflected in the sensor data from the vertical motion sensors. After the training process, vertical motion data evaluation software can assign the measurement data obtained while driving the vehicle with vertical motion sensors to the different types of shoulders, or classify it therewith.

It may be likewise advantageous if the shoulder of the road is detected by means of at least two vertical motion sensors and/or two-wheel speed sensors on opposite wheels of the motor vehicle, which serve as the detection device. "Opposite" is understood in particular to mean the two wheels on the left side and the two-wheel on the right side, if the motor vehicle has four wheels, for example. In particular, the at least two vertical motion sensors can then be on one of the left wheels and one of the right wheels, or one wheel speed sensor can be on one of the left wheels and one wheel speed sensor can be on one of the right wheels. In order to determine whether or not the vehicle is driving on a shoulder, the measurement data from the wheel speed sensors and/or the measurement data from the vertical motion sensors from the right and left wheels are then compared with one another. If the measurement data from the wheel speed sensors and/or the measurement data from the vertical motion sensors from both the left and right wheels indicate a rough surface, then the motor vehicle is probably not driving on the shoulder, but instead on cobblestones, a dirt road, or some other poor type of road surface. If the measurement data from the wheel speed sensors and/or the measurement data from the vertical motion sensors from either the left or right wheels indicate a rough surface, then the vehicle is potentially driving with either the left or right wheels on the shoulder. Whether or not this is critical, as described above, is determined using the respective evaluation software.

In some examples, the road surface on which the motor vehicle is located is detected, and the road surface is taken into account in evaluating the travel on the shoulder. In particular, potentially critical special situations, e.g., a road surface made of cobblestones, which exhibits a high friction coefficient and a rough surface, and a shoulder made of grass or sand, which has a low friction coefficient in comparison with the road, and a less rough surface, can likewise be identified via a simultaneous classification of the surfaces of the road and the shoulder using the method described herein. Furthermore, specific structures on the road surface, generated by reflections, shadows, and grooves, can likewise lead to erroneous identification of the shoulder by the camera.

Because learning data can also be generated for these specific structures on the road surface, the image data evaluation software for the camera can also be trained such that these specific structures are then classified as non-critical. The erroneous detection of driving on the shoulder in the case of specific structures on the road surface can thus be prevented. Furthermore, unevenness in the road surface, e.g., due to manhole covers, road damage, e.g. potholes, repairs in the asphalt, tar seams, corrugation in the asphalt, or Botts' dots in the asphalt, can also result in an erroneous identification of a shoulder by the wheel speed sensors. Because these also generate specific patterns in measurement data, the wheel speed evaluation software and/or vertical motion evaluation software can so be trained to recognize them, such that they are also classified as non-critical. The erroneous detection of a shoulder can thus be prevented in the case of unevenness in the road surface.

The disclosure presented herein also includes a computer-implemented method. Another aspect of the present disclosure relates to a computer program containing program code with which an electronic computing device executes the method according to the present disclosure when it is run on the electronic computer device. The computer program can be stored on a computer-readable memory, wherein the computer-readable memory can be formed on the electronic computing device.

Another aspect of the present disclosure relates to an assistance system for a motor vehicle that contains at least one electronic computing device and one detection device, wherein the assistance system is configured to execute a method according to the above aspect. In particular, the method is carried out by means of the assistance system.

Another aspect of the present disclosure relates to a motor vehicle that has an assistance system according to the above aspect.

Developments of the assistance system according to the present disclosure, as well as the motor vehicle according to the present disclosure, which exhibit features such as those already described in conjunction with the developments of the method according to the present disclosure. For this reason, these developments of the assistance system according to the present disclosure and the motor vehicle according to the present disclosure shall not be described again herein.

The present disclosure also includes the combination of features of the embodiments described herein.

BRIEF DESCRIPTION OF THE DRAWINGS

Exemplary embodiments of the present disclosure shall be explained below in reference to the schematic drawings. Therein.

DETAILED DESCRIPTION

Figure 1:
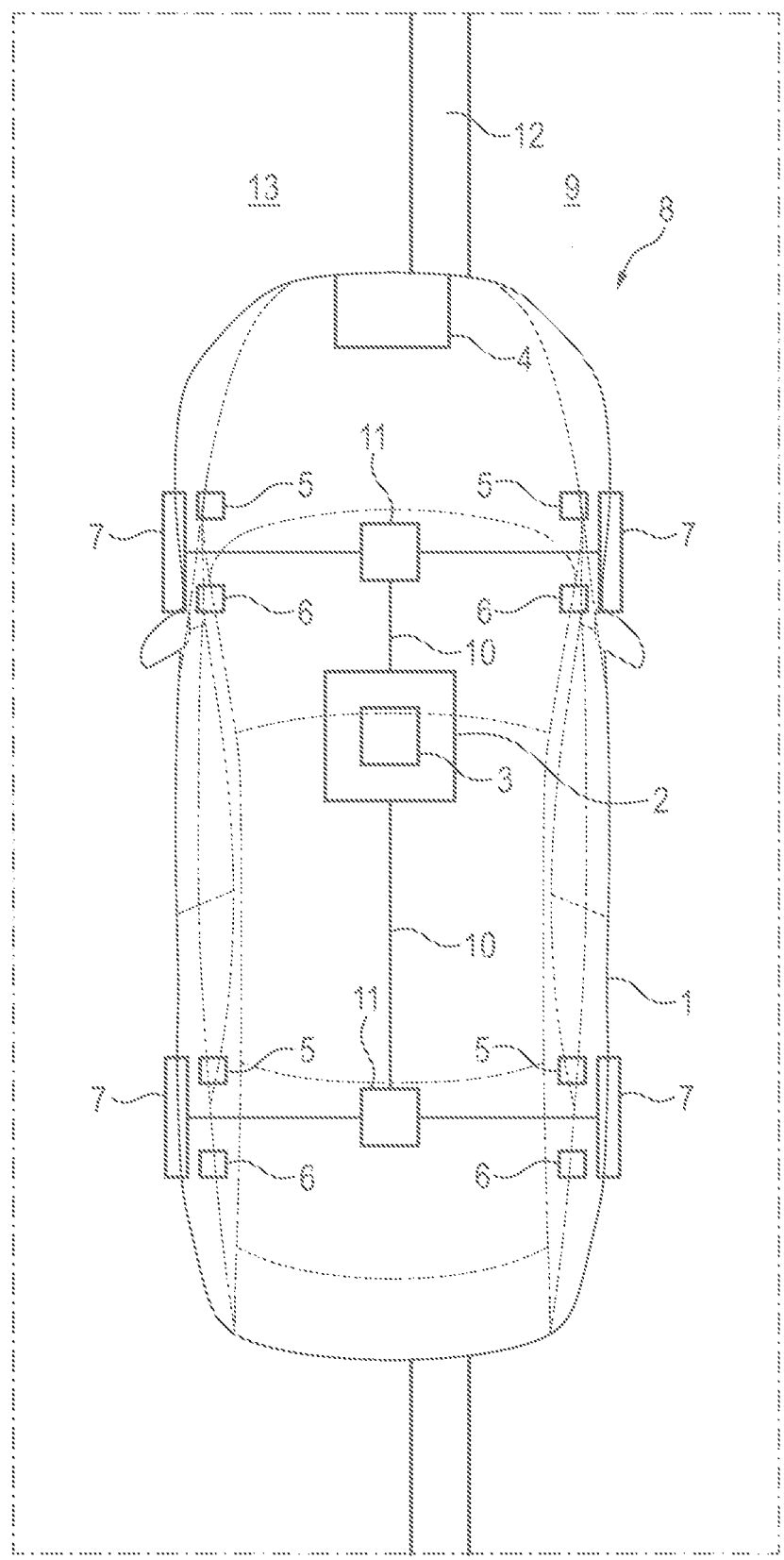
FIG. 1 shows a schematic top view of an embodiment of a motor vehicle that includes an assistance system, under some aspects of the present disclosure.

The exemplary embodiments described below are preferred exemplary embodiments of the present disclosure. The components described in the exemplary embodiments each represent individual, independent features of the present disclosure, each of which independently develop the present disclosure and are therefore to be regarded individually, or in combinations other than those shown, as components of the present disclosure. Furthermore, the exemplary embodiments described herein can also be supplemented by other features of the present disclosure described herein.

Functionally identical elements are provided with the same reference symbols in the drawing.

FIG. 1 shows a schematic top view of an embodiment of a motor vehicle 1 that has an embodiment of an assistance system 2. The assistance system 2 has an electronic computing device 3. The assistance system 2 also has at least one detection device 4, 5, 6. By way of example, the assistance system 2 can contain a camera 4 serving as the detection device 4, 5, 6. Furthermore, a respective wheel speed sensor 5 can form the detection device 4, 5, 6, and/or a respective vertical motion sensor 6 can form the detection device 4, 5, 6, on a respective wheel 7 of the motor vehicle 1.

Under this configuration, it is possible to detect when the motor vehicle 1 is driving 8 on the shoulder 9 of a road by means of the assistance system 2. In particular, the driving 8 on the shoulder 9 is detected by means of the at least one detection device 4, 5, 6, and a control signal 10 is generated by means of the electronic computing device 3 for engaging with a functional unit 11 in the motor vehicle 1 based on the detected shoulder driving 8.

The shoulder 9 of the road is evaluated with regard to a type of shoulder, and it is determined whether the motor vehicle is driving 8 on a critical or non-critical shoulder on the basis of the determined type of shoulder, and the control signal 10 is only generated in the case of a critical driving 8 on the shoulder.

In particular, the shoulder 9 of the road can be evaluated with regard to the type of shoulder by means of machine learning on the part of the electronic computing device 3.

A classification of whether the vehicle is driving 8 on the shoulder, and if so, which type of shoulder this is, takes place by means of the assistance system 2. By way of example, it is possible to determine that a shoulder, formed by grass, sand, gravel, etc. has a low friction coefficient, and can therefore be regarded as critical in particular. It is also possible to detect a shoulder with a high friction coefficient, made of cobblestone, paving stone, grass paving stone, grass plastic paving, or rumble strips, which is non-critical, in particular. The classification of the shoulder by pattern recognition takes place with an evaluation of the respective sensor data using a sensor-specific evaluation software. In particular, the detection devices 4, 5, 6 can be regarded as sensors in this case. The evaluation software is trained for the classification of the types of shoulders described above using learning data. Learning data comprise the temporal courses of the respective sensor data recorded during a test drive when travelling over the different types of shoulders specified above. The training of the evaluation software takes place using known processes, in particular machine learning.

This information, regarding whether a vehicle is driving 8 on a shoulder, and the type of shoulder, form the input data for a respective evaluation software for the respective sensors, or the respective detection devices 4, 5, 6, which are connected via a data bus to a data fusion algorithm in the electronic computing device 3. This data fusion algorithm determines from the input data obtained from the detection devices 4, 5, 6 whether the vehicle is driving 8 on the shoulder, and whether this is a critical shoulder with a low friction coefficient. If both are the case, the data fusion algorithm sends this information to a triggering algorithm. If a strong steering reaction by the driver in order to get off the shoulder 9 is detected at the same time, this triggering algorithm activates the shoulder function, represented in particular by the control signal 10. In particular, a selective braking of the wheels 7 on the shoulder 8 of the road can be carried out by means of an electronic stabilization system, wherein the electronic stabilization system (ESP) corresponds to the functional unit 11 in particular.

The determination of the type of shoulder can be carried out in particular on the basis of the different detection devices 4, 5, 6. By way of example, crossing the lane lines 12 or the edge of the roadway, corresponding in particular to the transition from asphalt to the shoulder 9, can be detected using the front camera 4. These data are already used in a so-called lane departure warning assistant or a lane keeping assistant, for example. Image sequences are recorded for this. An image data evaluation software is used for the learning, in that different typed of shoulders generate specific image patterns in the image sequences in the camera data, which can be assigned to the respective types of shoulders in order to distinguish them from one another. After the training, the image processing software can assign the data recorded with the front camera 4 while driving the vehicle on the different types of shoulders, or classify them, as described above.

Furthermore, it is possible to draw conclusions regarding the roughness of the substrate using the wheel speed sensors 5. These data can also serve in helping the anti-blocking system or a dynamic stability system, or to prevent rattling and humming in transmissions. These wheel speed sensors 5 record sensor data corresponding to a temporal course of the wheel speeds of the four wheels 7 on the motor vehicle 1. When driving over a rough surface, as may be the case when driving 8 on a shoulder, for example, the data for the temporal courses of these wheel speed sensors fluctuates substantially, even though the vehicle speed remains practically unchanged while driving 8 on the shoulder. The fact that the different types of shoulders generate specific patterns or specific fluctuations in the temporal courses of the wheel speed sensor data, which can be assigned to the respective types of shoulders, and thus distinguish them from one another, is exploited when training a wheel speed data evaluation software. Many of the shoulder surfaces with a high friction coefficient, e.g. rumble strips made of concrete slabs, lane marking lines 12, grass paving stone, etc. also exhibit uniform structures, which are reflected in the sensor data from the wheel speed sensors 5. After the training, the wheel speed data evaluation software can assign the data recorded with the wheel speed sensors 5 while driving the vehicle to the different types of shoulders, or classify them therein, as described above.

It is also possible to record the wheel movements in the vertical direction using vertical motion sensors 6, e.g., in a vertical regulation system in the motor vehicle 1, and therefore also draw conclusions regarding the roughness of the substrate therewith. The sensor data from the vertical motion sensors 6 relate to the temporal courses of the vertical motions of the four wheels 7 on the motor vehicle 1. On a rough substrate, the temporal courses of these sensor data fluctuate. The fact that the different types of shoulders generate specific patterns or specific fluctuations in the temporal courses of the vertical motion sensor data, which can be assigned to the respective types of shoulders, and therefore distinguish them from one another, is exploited in the training of the vertical motion data evaluation software. Many of the shoulder surfaces with a high friction coefficient, e.g., rumble strips made of concrete slabs, lane marking lines 12, grass paving stone, etc. also exhibit uniform structures which are reflected in the sensor data from the vertical motion sensors 6. After the training, the height data evaluation software can assign the data recorded with the vertical motion sensors 6 while driving the vehicle to the different types of shoulders, or classify them therein, as described above.

To determine whether or not the vehicle is driving 8 on the shoulder, the data from the wheel speed sensors 5 and/or the data from the vertical motion sensors 6 on the wheels 7 on the left and right are compared with one another. If the data from the wheel speed sensors 5 and/or the data from the vertical motion sensors 6 from the wheels 7 on both the left and the right indicate a rough substrate, then the motor vehicle 1 is very probably not driving on the shoulder 9, but instead on cobblestones, a dirt road, or some other poor road surface. If the data from the wheel speed sensors 5 and/or the data from the vertical motion sensors 6 for either the wheels 7 on the left or right indicate a rough substrate, the motor vehicle is potentially driving with either the left wheels 7 or the right wheels 7 on the shoulder 9. Whether or not this is critical is determined using the respective evaluation software, as described above.

Potentially critical special situations, such as a roadway 13 made of cobblestones and a shoulder 9 made of grass or sand, can be detected via simultaneous classification of the surfaces of the road 13 and the shoulder 9 using the method described above.

Specific structures on the road surface generated by reflections, shadows and grooves, for example, can likewise lead to an erroneous detection of driving 8 on the shoulder by the camera 4. Because learning data can also be generated for these specific structures on the road surface, the image data evaluation software from the camera 4 can be trained for this such that these specific structures are classified as non-critical. The erroneous detection of driving 8 on a shoulder in the case of specific structures on the road surface can thus be prevented.

Unevenness in the road surface, e.g., manhole covers, road damage, tar seams, corrugation in the asphalt, or Botts' dots in the asphalt, can likewise result in an erroneous detection of driving 8 on the shoulder by the wheel speed sensors 5. Because these types of unevenness also generate specific patterns in data, the wheel speed evaluation software and/or vertical motion evaluation software can be trained for this, such that they are classified as non-critical. The erroneous detection of driving 8 on the shoulder in the case of unevenness in the road surface can thus be prevented.

On the whole, the present disclosure results in a method for classifying types of shoulders.

LIST OF REFERENCE SYMBOLS

1 motor vehicle
2 assistance system
3 electronic computing device
4 camera
5 wheel speed sensor
6 vertical motion sensor
7 wheel
8 driving on the shoulder
9 shoulder
10 control signal
11 functional unit
12 lane marking line
13 road

The invention claimed is:
1. A system for operating an assistance system in a motor vehicle, comprising:
a computing device;

a functional unit, operatively coupled to the electronic device; and at least one detection device configured to visually detect a shoulder of a road that the motor vehicle has at least partially entered, wherein the computing device is configured to process the detected shoulder of a road using machine learning to classify a type of shoulder, the shoulder type comprising:

a critical shoulder characterized by a first friction coefficient indicative of potential vehicle instability requiring system intervention, and a non-critical shoulder characterized by a second friction coefficient indicative of stable vehicle operation, the second friction coefficient being higher than the first friction coefficient, and wherein the computing device is configured to generate and transmit a control signal for the functional unit if a non-critical shoulder type is detected.

2. The system of claim 1, wherein the at least one detection device comprises at least one camera.

3. The system of claim 1, wherein the at least one detection device comprises at least two wheel sensors on different wheels of the motor vehicle, and wherein the computing device is configured to detect and classify a type of shoulder based on data from at least two wheel sensors.

4. The system of claim 3, wherein the computing device is configured to process the detected shoulder of the road to classify the type of shoulder based on a comparison between temporal courses of the at least two wheel speed sensors.

5. The system of claim 1, wherein the computing device is configured to detect and classify a type of shoulder based on different image patterns received from the detection device.

6. The system of claim 1, wherein the detection device comprises at least two vertical motion sensors and/or two wheel speed sensors on opposite wheels on the motor vehicle.

7. The system of claim 1, wherein the computing device is configured to process the detected shoulder of the road to determine a road surface of the road, and wherein the computing device is configured to process the detected shoulder of the road to classify the type of shoulder utilizing the road surface.

8. A method for operating an assistance system in a motor vehicle, comprising:

visually detecting, via at least one detection device, a shoulder of a road that the motor vehicle has at least partially entered, processing, via a computing device, the detected shoulder of a road using machine learning to classify a type of shoulder, the shoulder type comprising:

a critical shoulder characterized by a first friction coefficient indicative of potential vehicle instability requiring system intervention, and a non-critical shoulder characterized by a second friction coefficient indicative of stable vehicle operation, the second friction coefficient being higher than the first friction coefficient, and generating and transmitting a control signal for a functional unit of the assistance system if a critical shoulder type is detected.

9. The method of claim 8, wherein the at least one detection device comprises at least one camera.

10. The method of claim 8, wherein the at least one detection device comprises at least two wheel sensors on different wheels of the motor vehicle, and wherein the detecting and classifying a type of shoulder comprises detecting and classifying based on data from at least two wheel sensors.

11. The method of claim 10, wherein processing the detected shoulder of the road to classify the type of shoulder comprises processing the detected shoulder based on a comparison between temporal courses of the at least two wheel speed sensors.

12. The method of claim 8, wherein detecting and classify the type of shoulder comprises detecting and classify the type of shoulder based on different image patterns received from the detection device.

13. The method of claim 8, wherein the detection device comprises at least two vertical motion sensors and/or two wheel speed sensors on opposite wheels on the motor vehicle.

14. The method of claim 8, further comprising processing the detected shoulder of the road to determine a road surface of the road, and wherein classifying the type of shoulder comprises utilizing the road surface.

15. A system for operating an assistance system in a motor vehicle, comprising:

a computing device;

a functional unit, operatively coupled to the electronic device; and at least one detection device configured to visually detect a shoulder of a road that the motor vehicle has at least partially entered, wherein the computing device is configured to process the detected shoulder of a road using machine learning to classify a type of shoulder, the shoulder type comprising:

a critical shoulder characterized by a first friction coefficient indicative of potential vehicle instability requiring system intervention, and a non-critical shoulder characterized by a second friction coefficient indicative of stable vehicle operation, the second friction coefficient being higher than the first friction coefficient, wherein the computing device is configured to process the detected shoulder of the road to determine a road surface of the road, and wherein the computing device is configured to process the detected shoulder of the road to classify the type of shoulder utilizing the road surface, and wherein the computing device is configured to generate and transmit a control signal for the functional unit if a non-critical shoulder type is detected.

16. The system of claim 15, wherein the at least one detection device comprises at least one camera.

17. The system of claim 15, wherein the at least one detection device comprises at least two wheel sensors on different wheels of the motor vehicle, and wherein the computing device is configured to detect and classify a type of shoulder based on data from at least two wheel sensors.

18. The system of claim 17, wherein the computing device is configured to process the detected shoulder of the road to classify the type of shoulder based on a comparison between temporal courses of the at least two wheel speed sensors.

19. The system of claim 15, wherein the computing device is configured to detect and classify a type of shoulder on the basis of different image patterns received from the detection device.

20. The system of claim 15, wherein the detection device comprises at least two vertical motion sensors and/or two wheel speed sensors on opposite wheels on the motor vehicle.

* * * * *